(12) United States Patent
Mautner et al.

(10) Patent No.: US 11,994,586 B2
(45) Date of Patent: May 28, 2024

(54) USING TIME-OF-FLIGHT AND PSEUDO-RANDOM BIT SEQUENCES TO MEASURE DISTANCE TO OBJECT

(71) Applicant: ams AG, Premstaetten (AT)

(72) Inventors: Christian Mautner, Eindhoven (NL);
Daniel Furrer, Eindhoven (NL);
Daniele Perenzoni, Eindhoven (NL);
Robert Kappel, Eindhoven (NL)

(73) Assignee: AMS AG, Premstaetten (AT)

( * ) Notice: Subject to any disclaimer, the term of this patent is extended or adjusted under 35 U.S.C. 154(b) by 607 days.

(21) Appl. No.: 16/973,662

(22) PCT Filed: Jun. 4, 2019

(86) PCT No.: PCT/EP2019/064419
§ 371 (c)(1),
(2) Date: Dec. 9, 2020

(87) PCT Pub. No.: WO2019/243038
PCT Pub. Date: Dec. 26, 2019

(65) Prior Publication Data
US 2021/0199802 A1 Jul. 1, 2021

Related U.S. Application Data

(60) Provisional application No. 62/688,598, filed on Jun. 22, 2018.

(51) Int. Cl.
*G01S 17/08* (2006.01)
*G01S 7/48* (2006.01)
(Continued)

(52) U.S. Cl.
CPC ............ *G01S 17/08* (2013.01); *G01S 7/4808* (2013.01); *G01S 7/4865* (2013.01); *G01S 7/487* (2013.01); *G01S 17/26* (2020.01); *G01S 17/89* (2013.01)

(58) Field of Classification Search
CPC .... G01S 7/4808; G01S 7/4865; G01S 7/4866; G01S 7/4868; G01S 7/487; G01S 7/4873;
(Continued)

(56) References Cited

U.S. PATENT DOCUMENTS 10,048,356 B2 * 8/2018 Takano ................... G01S 17/10
10,120,066 B2 * 11/2018 Yang ....................... H04N 23/57
(Continued)

FOREIGN PATENT DOCUMENTS

CN 106772431 A * 5/2017 ............. G01S 17/86
CN 107533139 A * 1/2018 ............. G01S 17/46
(Continued)

OTHER PUBLICATIONS

International Search Report and Written Opinion for Application No. PCT/EP2019/064419 dated Sep. 9, 2019 (9 pages).
(Continued)

*Primary Examiner* — Gordon J Stock, Jr.
(74) *Attorney, Agent, or Firm* — Viering, Jentschura & Partner mbB; Robert M Bilotta, Jr.

(57) ABSTRACT

The present disclosure describes a method and apparatus for enabling an imaging sensor to perform Time-of-Flight measurements while requiring less histogram memory and in many cases less power consumption. A light source is operated to cause multiple light emissions and a coarse/estimated distance is determined based on a first echo received based on the first light emission. A histogram is saved and a fine distance is calculated from the coarse distance and data derived from the echo of a second light emission.

20 Claims, 10 Drawing Sheets

(51) Int. Cl.
    *G01S 7/4865*      (2020.01)
    *G01S 7/487*      (2006.01)
    *G01S 17/26*      (2020.01)
    *G01S 17/89*      (2020.01)

(58) Field of Classification Search
    CPC ........ G01S 7/4876; G01S 17/08; G01S 17/10;
               G01S 17/14; G01S 17/18; G01S 17/26;
                      G01S 17/88; G01S 17/89
    See application file for complete search history.

(56) References Cited

U.S. PATENT DOCUMENTS

| | | | | |
|---|---|---|---|---|
| 10,132,616 | B2* | 11/2018 | Wang | G01B 11/22 |
| 10,269,104 | B2* | 4/2019 | Hannuksela | G06T 5/002 |
| 10,705,212 | B2* | 7/2020 | Sato | G01S 17/10 |
| 10,754,033 | B2* | 8/2020 | Shand | G01S 17/10 |
| 10,866,321 | B2* | 12/2020 | Yamada | G01S 17/46 |
| 10,878,117 | B2* | 12/2020 | Yang | G01S 17/88 |
| 10,884,126 | B2* | 1/2021 | Shu | G01S 7/4863 |
| 10,996,323 | B2* | 5/2021 | Patanwala | G01S 17/894 |
| 11,047,960 | B2* | 6/2021 | Franzreb | G01S 17/42 |
| 11,320,514 | B2* | 5/2022 | Keller | G01S 7/2926 |
| 11,391,843 | B2* | 7/2022 | Vaello Paños | G01S 17/894 |
| 11,415,680 | B2* | 8/2022 | Shand | G01S 17/42 |
| 11,467,286 | B2* | 10/2022 | Finkelstein | G01S 7/4863 |
| 11,493,613 | B2* | 11/2022 | Seliuchenko | G01S 7/483 |
| 11,493,614 | B2* | 11/2022 | Gong | G01S 7/4861 |
| 11,513,197 | B2* | 11/2022 | Yang | G01S 17/10 |
| 11,579,291 | B2* | 2/2023 | Stoppa | G01S 7/484 |
| 11,579,298 | B2* | 2/2023 | Shin | G01S 17/89 |
| 11,598,859 | B2* | 3/2023 | Ta | G01S 17/42 |
| 11,609,313 | B2* | 3/2023 | Onal | G01S 7/4804 |
| 11,662,433 | B2* | 5/2023 | Miki | G01S 17/89 702/159 |
| 11,747,452 | B2* | 9/2023 | Ohki | G01S 17/10 356/4.01 |
| 2012/0044093 | A1* | 2/2012 | Pala | G01S 17/86 340/963 |
| 2013/0142395 | A1 | 6/2013 | Han et al. | |
| 2015/0015868 | A1 | 1/2015 | Jachman et al. | |
| 2015/0204978 | A1 | 7/2015 | Hammes et al. | |
| 2016/0033644 | A1 | 2/2016 | Moore | |
| 2017/0052065 | A1 | 2/2017 | Sharma et al. | |
| 2017/0115395 | A1 | 4/2017 | Grauer et al. | |
| 2017/0179173 | A1* | 6/2017 | Mandai | H01L 27/14609 |
| 2017/0200273 | A1* | 7/2017 | Kamilov | G01S 17/86 |
| 2017/0353649 | A1 | 12/2017 | Yang et al. | |
| 2017/0365068 | A1* | 12/2017 | Tan | H04N 13/271 |
| 2018/0020209 | A1* | 1/2018 | Ko | H04N 13/289 |
| 2018/0081041 | A1 | 3/2018 | Niclass et al. | |
| 2018/0164415 | A1 | 6/2018 | Buckley et al. | |
| 2018/0249143 | A1* | 8/2018 | Calpe Maravilla | G01S 7/4814 |
| 2018/0275259 | A1* | 9/2018 | Ott | G01S 13/5246 |
| 2018/0335514 | A1 | 11/2018 | Dees et al. | |
| 2019/0004156 | A1* | 1/2019 | Niclass | G01S 7/4863 |
| 2019/0018115 | A1* | 1/2019 | Schmitt | G01S 7/4815 |
| 2020/0003900 | A1* | 1/2020 | Stochino | G01S 7/4802 |
| 2020/0116838 | A1 | 4/2020 | Erdogan et al. | |
| 2020/0400820 | A1* | 12/2020 | Nauen | G01S 7/484 |
| 2021/0311171 | A1* | 10/2021 | Richards | G01S 17/894 |
| 2022/0082659 | A1* | 3/2022 | Li | G01S 13/08 |

FOREIGN PATENT DOCUMENTS

| | | |
|---|---|---|
| TW | I461656 B | 11/2014 |
| TW | 201721171 A | 6/2017 |

OTHER PUBLICATIONS

Taiwanese Search Report issued for the corresponding TW patent application No. TW108119430, dated Jun. 22, 2018, 1 page (For informational purposes only).

Chinese Office Action issued for the corresponding Chinese patent application No. 201980047684.1, dated Dec. 1, 2023, 8 pages and 6 pages of English translation (for informational purposes only).

Chinese Office Action issued for corresponding Chinese patent application No. 201980047684, dated May 23, 2023, 8 pages (for informational purposes only).

Chinese Search Report issued for corresponding Chinese patent application No. 201980047684, dated May 23, 2023, 3 pages (for informational purposes only).

\* cited by examiner

USING TIME-OF-FLIGHT AND PSEUDO-RANDOM BIT SEQUENCES TO MEASURE DISTANCE TO OBJECT

FIELD OF THE DISCLOSURE

This disclosure relates to measuring distance to an object using imaging sensors.

BACKGROUND

Determining a distance between an imaging sensor and an object is vital in many uses of imaging sensors. One system created to determine a distance between an imaging sensor and an object is called a Time-of-Flight ("ToF") measurement system. There are various ToF measurement systems in existence today. Some ToF systems use direct mode of measurement while others use indirect mode of measurement.

In some direct mode ToF systems, a light pulse is emitted and a time measurement is performed when the light pulse is reflected by an object and that reflected light is detected by the imaging sensor. In some cases, these times are called Time-to-Digital Converter ("TDC") or Time-to-Analog Converter ("TAC"). Based on the TDC or TAC and the speed of light, a distance to object is determined. In some indirect mode ToF measurement systems, emitted light is modulated, and the sensor demodulates the received echo, extracting the phase difference between the emitted signal and received signal. From the phase difference, the distance information is then determined.

SUMMARY

In direct mode ToF systems the measurement data is retained in histogram memory while the measurement is repeated a certain number of times so that a more accurate result can be achieved. For every measurement, the measuring system has to build a histogram for each pixel, which requires a relatively large amount of storage. In addition, conventional direct ToF systems require large power consumption in the form of high-energy pulses in order to be accurate because low energy pulses will not yield enough information to be accurate in many instances. In conventional indirect ToF systems, in order to achieve high precision, a high modulation frequency needs to be used, which leads to high power consumption and an increased system complexity.

The current disclosure describes a system that performs ToF measurements while requiring less histogram memory and, in some cases, less power consumption. Specifically, an apparatus, system, and method are described for measuring a distance between an imaging sensor and an object. The distance measuring system causes (e.g., using a light source) a first light emission from the light source and a second light emission from the light source. For example, in direct ToF measurement systems the light emission may be a laser pulse or another suitable light pulse. In indirect ToF measurement systems, the light emissions may be any emission that is modulated so that an echo can be demodulated.

The distance measuring system detects (e.g., using an imaging sensor) a first echo resulting from the first light emission being reflected by an object and a second echo resulting from the second light emission being reflected by the object. For example, in direct ToF systems, the imaging sensor may detect echoes from the first and the second light pulses as the light pulses are reflected from an object. In indirect ToF systems, the first and second emissions may be modulated and, when echoes are received by the imaging sensor, the echoes may be demodulated.

When the distance measuring system receives (e.g., via the imaging sensor) the first echo, the distance measuring system extracts, data from the first echo, and determines, based on the data from first echo, an estimated distance to the object. For example, the distance measuring system may determine, based on the first echo that an object is located somewhere between four and five meters from the imaging sensor. When the distance measuring system receives (e.g., via the imaging sensor) the second echo, distance information is extracted from the second echo. Using the estimated distance determined from the first echo, the distance measuring system identifies, within the second echo, data corresponding to the estimated distance. For example, the data associated with the second echo may include data for different distances from the imaging sensor. However, because, in this example, the system has determined, based on the first echo, that the object is between four and five meters from the imaging sensor, the distance measuring system identifies data associated with the distance between four and five meters.

When the data corresponding to the estimated distance is identified, the distance measuring system generates a histogram using the identified data that corresponds to the estimated distance, and stores the histogram in the memory. For example, if the distance measuring system has determined that the object is between four and five meters from the imaging sensor, the distance measuring system stores a histogram of data derived from the second echo for the distance between four meters and five meters. Data associated with other distances can be discarded in order to save histogram memory, which in many instances is very limited. The distance measuring system is further configured to calculate, based on the stored histogram, a distance to the object. For example, the distance measuring system may analyze the data and determine that the object is located a certain distance (e.g., 4.5 meters) from the imaging sensor.

In some embodiments, only the histogram data for the second light emission is stored, and the distance measuring system discards data associated with the first echo. In addition, the distance measuring system may discard data associated with the second echo that does not correspond to the estimated distance. To continue with the example above, only data derived from the second echo associated with the estimated distance (e.g., data associated with the 4.5 meter distance) is stored in histogram memory.

In some embodiments, the distance measuring system causes the second light emission after a period of time after causing the first light emission. Specifically, the distance measuring system retrieves a non-ambiguity period associated with the first light emission. The non-ambiguity period may be a period of time corresponding to a maximum distance that the distance measuring system is configured to measure. The distance measuring system determines that the non-ambiguity period from the first light emission has been reached, and causes the second light emission after the non-ambiguity period has been reached.

In some embodiments, in direct mode ToF systems the first emission and the second emissions may be a first light pulse and a second light pulse, and the first light pulse may be longer than the second light pulse. For example, the first longer pulse enables the distance measuring system collect more light data to get as much information is possible. The second light pulse may be shorter as not as much data over the full distance is needed, but rather data for a specific range (e.g., four meters to five meters) is needed.

In some embodiments, in indirect mode ToF systems the first light emission is modulated at a lower frequency than the second light emission. This may be advantageous in instances where, at a lower frequency modulation for the first emission, more data can be received, therefore, increasing the possibility of detecting a general location of the object. The second emission may be of a higher frequency so that a more accurate detection can occur.

In some embodiments, it may be advantageous to generate multiple emissions during a predetermined time window. Specifically, the distance measuring system may retrieve a time period corresponding to maximum time between the first light emission and receiving any echo for the first light emission, and cause, during that time period, an additional number of light emissions from the light source. When the time period has ended, the distance measuring system may stop the light source from further emissions. For example, the distance measuring system may retrieve a one second time interval and generate eight light emissions during that time interval. After the one second time interval expires, the distance measuring system stops causing any further light emissions.

In some embodiments, the distance measuring system is further configured to cause the light emissions in a specific sequence where the sequence instructs the distance measuring system to split the time period into multiple time periods (sub-periods) and where the sequence instructs the distance measuring system to cause emissions during some of the multiple time periods without causing the emissions during other of the multiple time periods. For example, the distance measuring system may split the time period into sixteen distinct sub-periods. During some of the sixteen sub-periods the distance measuring system may cause an emission of light while not causing an emission of light during others thereby creating a sequence. The distance measuring system may cause an emission of light during the first, third, fourth, sixth, seventh, eleventh, twelfth, and sixteenths sub-period and refrain from causing emissions during the other sub-periods.

The imaging sensor is further operable to detect echoes for any light emissions, whether from the light source or from other light sources. The received echoes are processed by the distance measuring system where the echoes caused by emissions from the light source are identified, based on the sequence of light emissions. The distance measuring system discards data associated with signals representing the light from the other light sources. For example, if distance measuring system caused an emission of light during the first, third, fourth, sixth, seventh, eleventh, twelfth, and sixteenths sub-period and refrained from causing emissions during the other sub-periods, the distance measuring system subtracts echo data received during the second, fifth, eighth, ninth, tenth, thirteenth, fourteenth, and fifteenth sub-periods while summing echo data values associated with first, third, fourth, sixth, seventh, eleventh, twelfth, and sixteenths sub-periods. The distance measuring system discards signals that are not correlated to the sequence.

The distance measuring system stores data corresponding to echoes for the identified light emissions in a histogram memory, and generates a measurement of distance to the object based on the data in the histogram memory. To continue with the example above, the distance measuring system sums data values for the first, third, fourth, sixth, seventh, eleventh, twelfth, and sixteenths sub-periods in histogram memory and subtracts data values for the other periods to generate a measurement of distance to object based on the data in the histogram memory.

The details of one or more implementations are set forth in the accompanying drawings and the description below. Other features and advantages will be apparent from the description, the accompanying drawings, and the claims.

DETAILED DESCRIPTION

Figure 1:
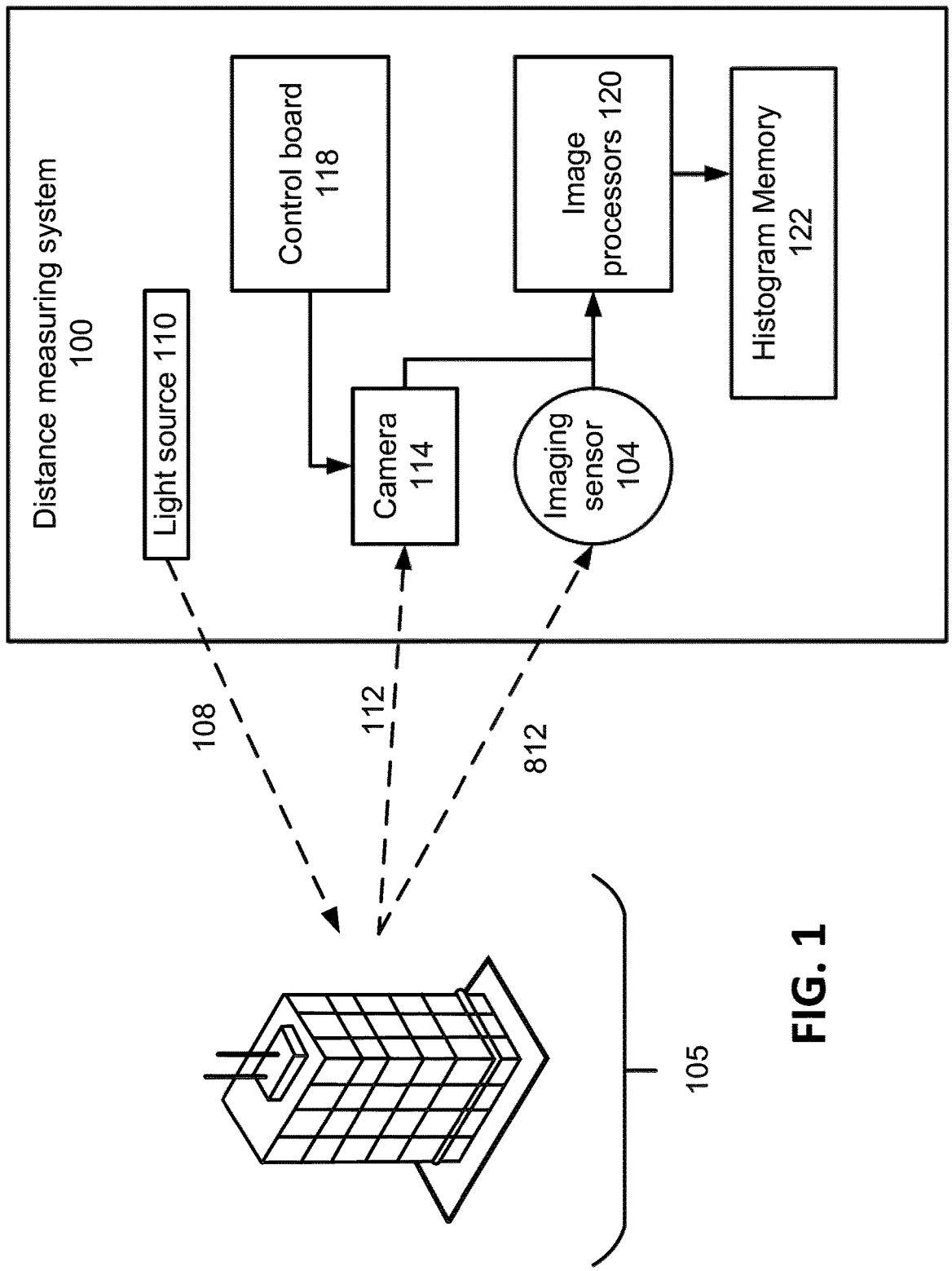
FIG. 1 is an example distance measuring system 100 that employs ToF sensing to calculate a distance to object

FIG. 1 is an example distance measuring system 100 that employs ToF sensing to calculate a distance to object 102 (in this example, a building). The distance measuring system 100 includes an imaging sensor 104 that includes an array (e.g., a two-dimensional (2-D) array) of pixels.

The object 102 is illuminated with illumination light 108 from a light source 110, such as a laser. For instance, the light 108 can be infrared (IR) light. Some of the illumination light is reflected by the object. The reflected light 112 is detected by a camera 114 and by the imaging sensor 104. The distance information from the pixels, in combination with a 2-D image of the environment obtained by the camera 114, are stored in histogram memory 122 by one or more image processors 120. The data from histogram memory 122 is used to calculate distance to object 102. The distance information R for each pixel can be calculated as:

$$R=(c*\text{ToF})/2,$$

where c is the speed of light and ToF is the time of flight, which is the elapsed time between emission of light from the light source 110 and detection of the reflected light by the imaging sensor 104.

Each demodulation pixel of the imaging sensor 104 is capable of demodulating the received light signal 112. A control board (e.g., including control circuitry) 118 is configured to regulate the timing of the camera 114. The phase values of all pixels of the imaging sensor 104 correspond to distance information R for a corresponding point in the environment 105, e.g., on the building 102. In some examples, the demodulation of the reflected light can deliver the time of flight value directly. In some examples, the modulated illumination light can be continuously intensity modulated light, and the demodulation of the reflected light can deliver the phase delay (P) between the emitted light and the reflected light. The phase delay corresponds to the distance R as follows:

$$R=(P \cdot c)/(4\pi f\_mod),$$

where f mod is the modulation frequency of the illumination light, which can range from, e.g., a few MHz up to several GHz. In some implementations, each demodulation pixel is capable of demodulating the reflected light concurrently, the imaging sensor 104 can deliver image data in substantially real time, e.g., frame rates of up to 30 Hz or greater than 30 Hz. Increased lateral transfer time of the photogenerated charge carriers in the demodulated pixels can contribute to high frequency image delivery.

Figure 2:
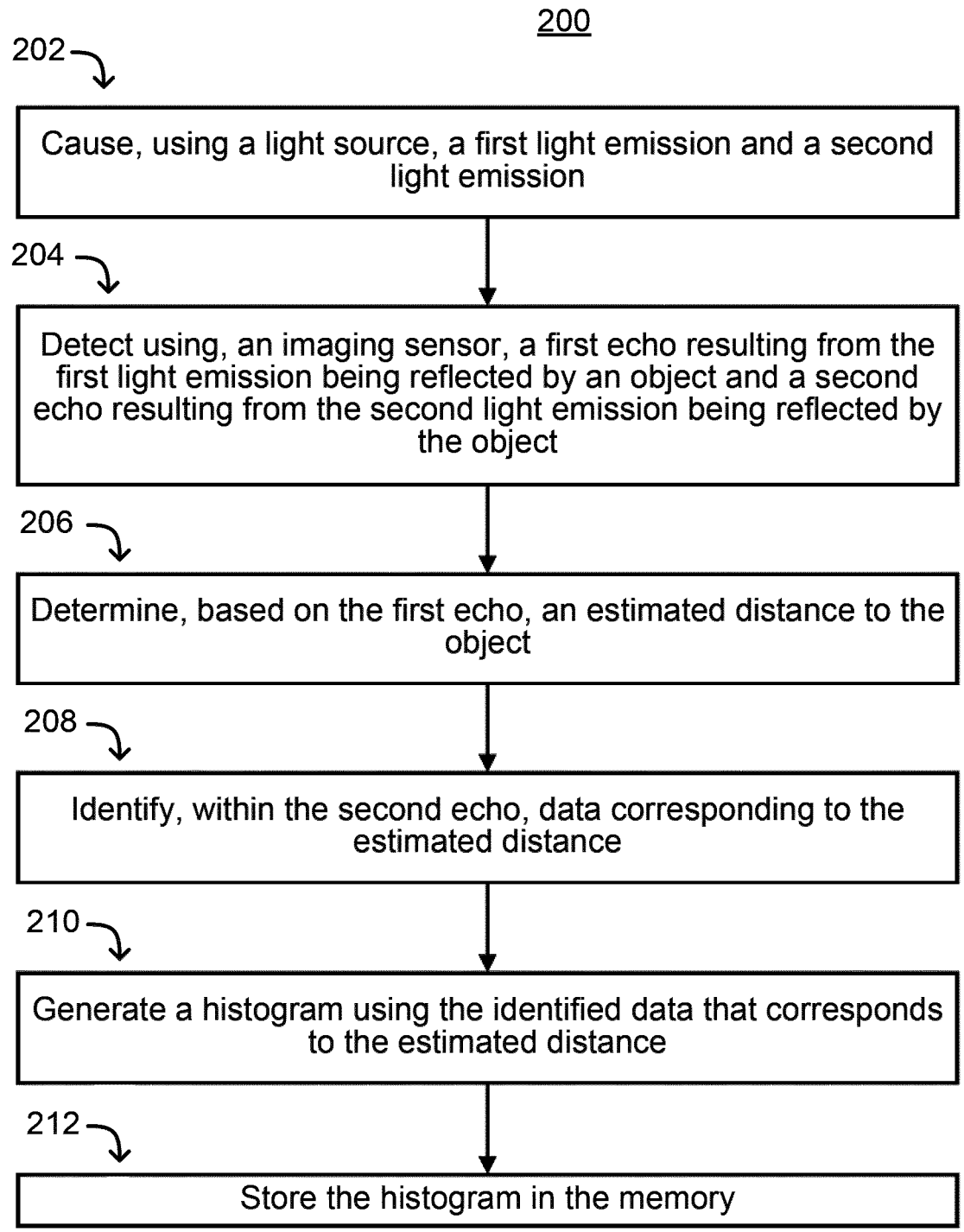
FIG. 2 is a block diagram that illustrates actions for measuring a distance to an object.

FIG. 2 is a block diagram that illustrates actions for measuring a distance to an object. In block 202 control circuitry (e.g., control circuitry included in control board 118) causes, using a light source (e.g., light source 110), a first light emission and a second light emission. For example, control board 118 may instruct light source 110 to trigger the first and second light emissions. The first and second light emissions may be visible spectrum light, infrared light, or another suitable light type. In some embodiments, such as in direct ToF systems, the light emissions may be laser pulses. In indirect Tof measurement systems the light emissions may be any emission that is modulated so that an echo can be demodulated.

In block 204 control circuitry (e.g., control circuitry included in control board 118) detects using, an imaging sensor (e.g., imaging sensor 104), a first echo resulting from the first light emission being reflected by an object (e.g., object 102) and a second echo resulting from the second light emission being reflected by the object (e.g., object 102). For example, in direct ToF systems, the imaging sensor (e.g., imaging sensor 104) may detect echoes from the first and the second light pulses as the light pulses are reflected from an object. In indirect ToF systems, the first and second emissions may be modulated and when echoes are received by the imaging sensor (e.g., imaging sensor 104) the echoes may be demodulated.

Figure 3:
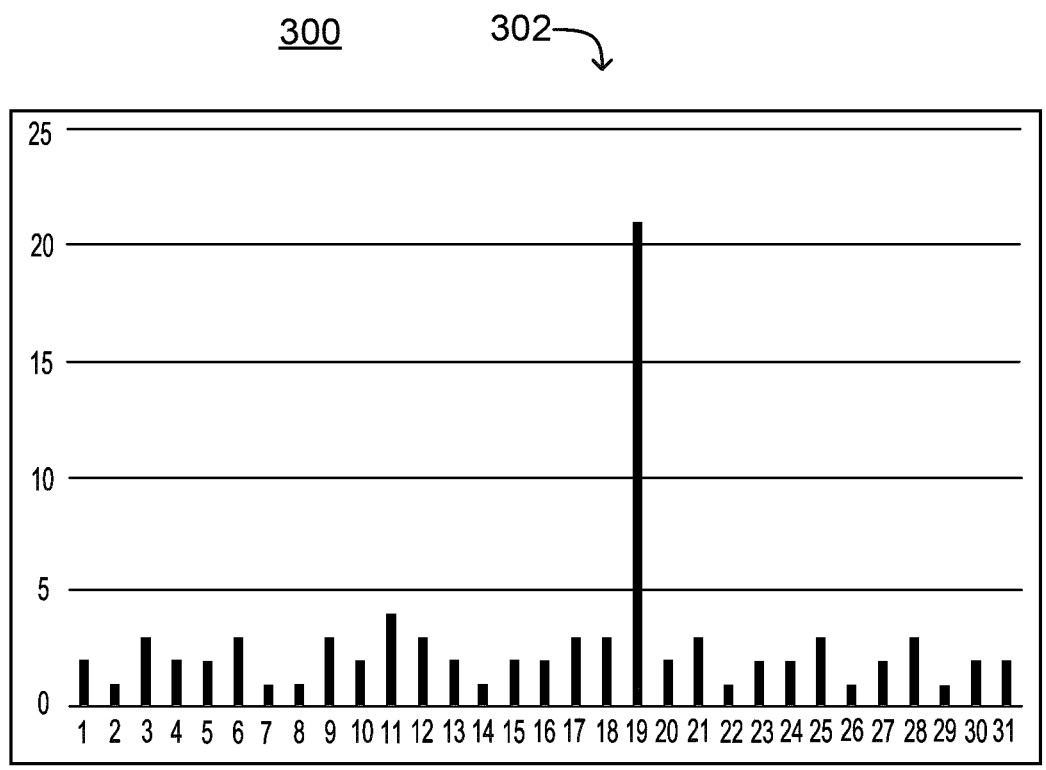
FIG. 3 illustrates data extracted from the first echo and the second echo.
Figure 3:
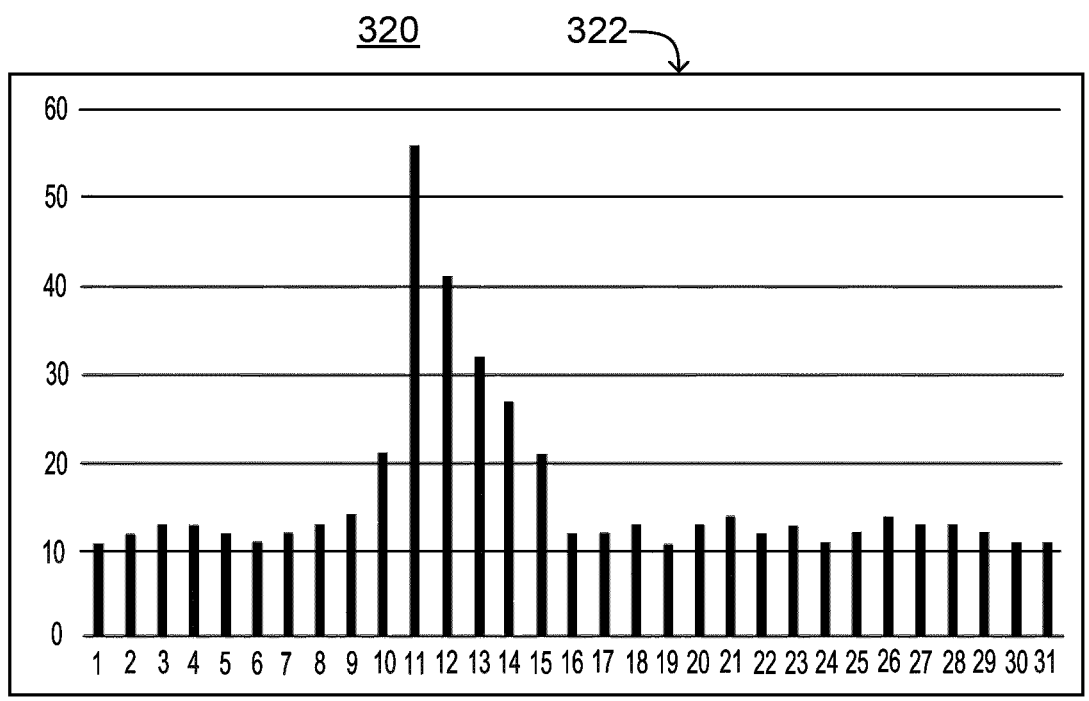

In block 206, the control circuitry (e.g., control circuitry included in control board 118) determines, based on the first echo, an estimated distance to the object. The control circuitry may analyze the light of the first echo and determine a general location of an object. Graph 300 of FIG. 3 illustrates data extracted from the first echo. The graph indicates the general location of the object (e.g., at nineteen meters). Peak 302 corresponds to the general location of the object.

In block 208, the control circuitry (e.g., control circuitry included in control board 118) identifies, within the second echo, data corresponding to the estimated distance. The control circuitry may analyze the light of the second echo and determine a specific location of the object. Graph 320 of FIG. 3 illustrates data extracted from the second echo. The graph indicates a specific location of the object. Graph 320 illustrates a breakdown of the nineteen meter distance into thirty two portions and illustrates that the object is located between the tenth and fifteenth portion of the thirty two portions. Peak 322 corresponds to a precise location of the object.

Figure 4:
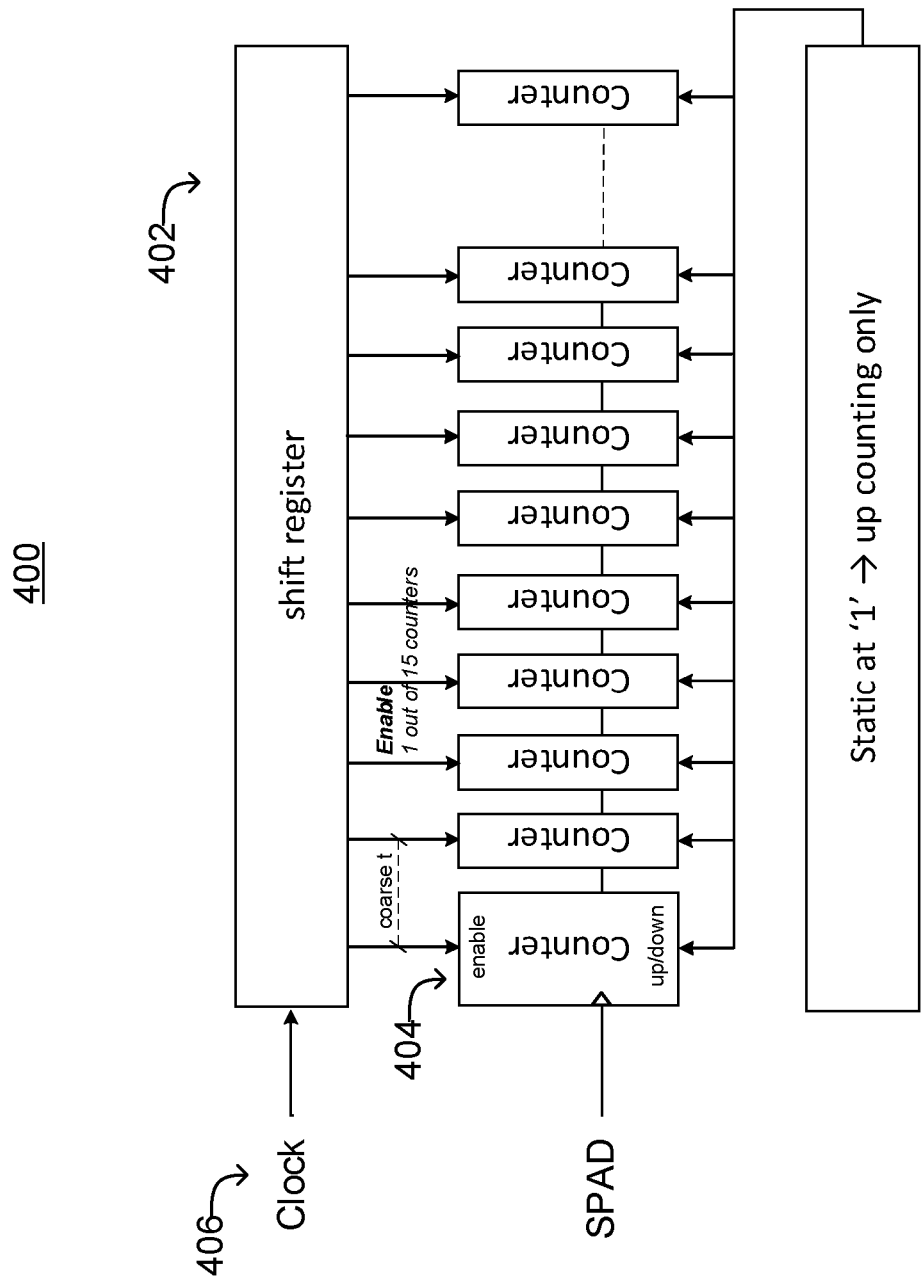
FIG. 4 illustrates a method of storing histogram data.

In block 210, the control circuitry (e.g., control circuitry included in control board 118) generates a histogram using the identified data that corresponds to the estimated distance and in block 212 stores the histogram in the memory (e.g., histogram memory 122). FIG. 4 illustrates one method of storing the histogram data. The system may use Time to Digital Converter ("TDC") based on shift register (e.g., shift register 402) plus counters (e.g., counters 404) for the coarse evaluation (e.g., determining an estimated distance with data from the first echo), the shared histogram memory and a delay line for fine evaluation (e.g., determining a precise distance with data from the second echo). The detector may be a macro-pixel composed of n Single Photon Avalanche Diodes ("SPADs"), the output of each SPAD can be combined together with an OR-tree or a XOR-tree. A shift register fed with a global clock may act as coarse TDC with a time resolution given by the input clock 406. When a SPAD generates a trigger (e.g., a light emission), the counters are clocked and only the one with the "high" level propagated through the shift register at its input will increase its value, building the histogram.

In some embodiments, a wide Vertical Surface Emitting LASER ("VCSEL") may be used for more optical power. In addition, fifteen time-gated counters can be used. The system may build up enough counts to find a maximum peak for selecting a zoom-in range (e.g., a general location of the object as illustrated in graph 300). In some embodiments, the system disregards the first counter because it contains cross talk of cover glass. This operation is repeated until the coarse evaluation (e.g., based on the first light emission and the first echo) is ended and an output value is stored. In some instances, the coarse evaluation may be repeated multiple times.

Figure 5:
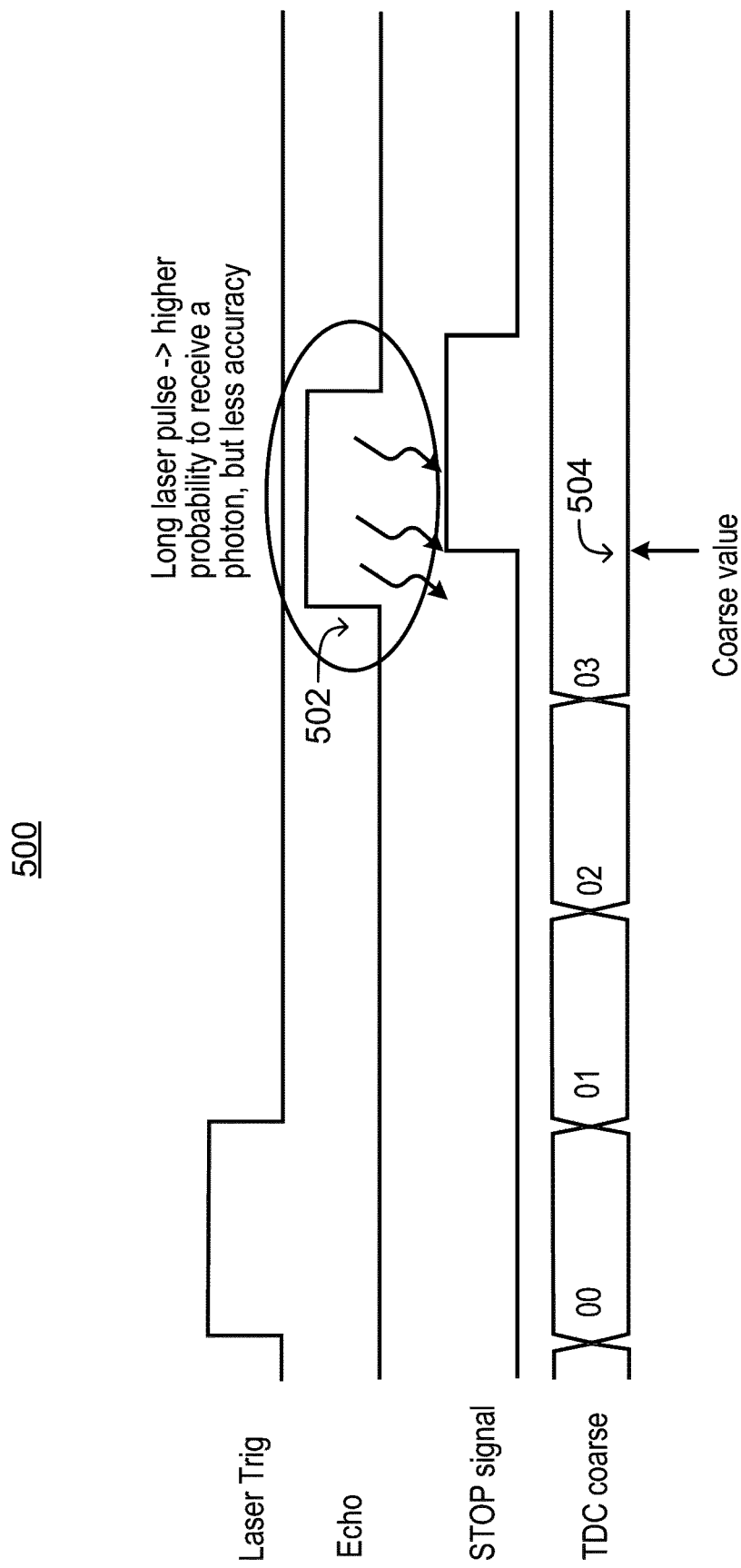
FIG. 5 illustrates using a laser pulse to perform a rough evaluation.

In some embodiments, the control circuitry performs the coarse evaluation using a high energy pulse to roughly evaluate the target distance. FIG. 5 illustrates using a laser pulse to perform a rough evaluation. Illustration 500 shows a laser trigger and an echo (echo 502) received from the laser trigger. A stop signal is initiated after the laser pulse. A longer laser pulse corresponds to a higher probability of receiving photons back, but with less accuracy. A coarse TDC measurement is performed based on the received echo. The coarse value 504 is calculated.

Figure 6:
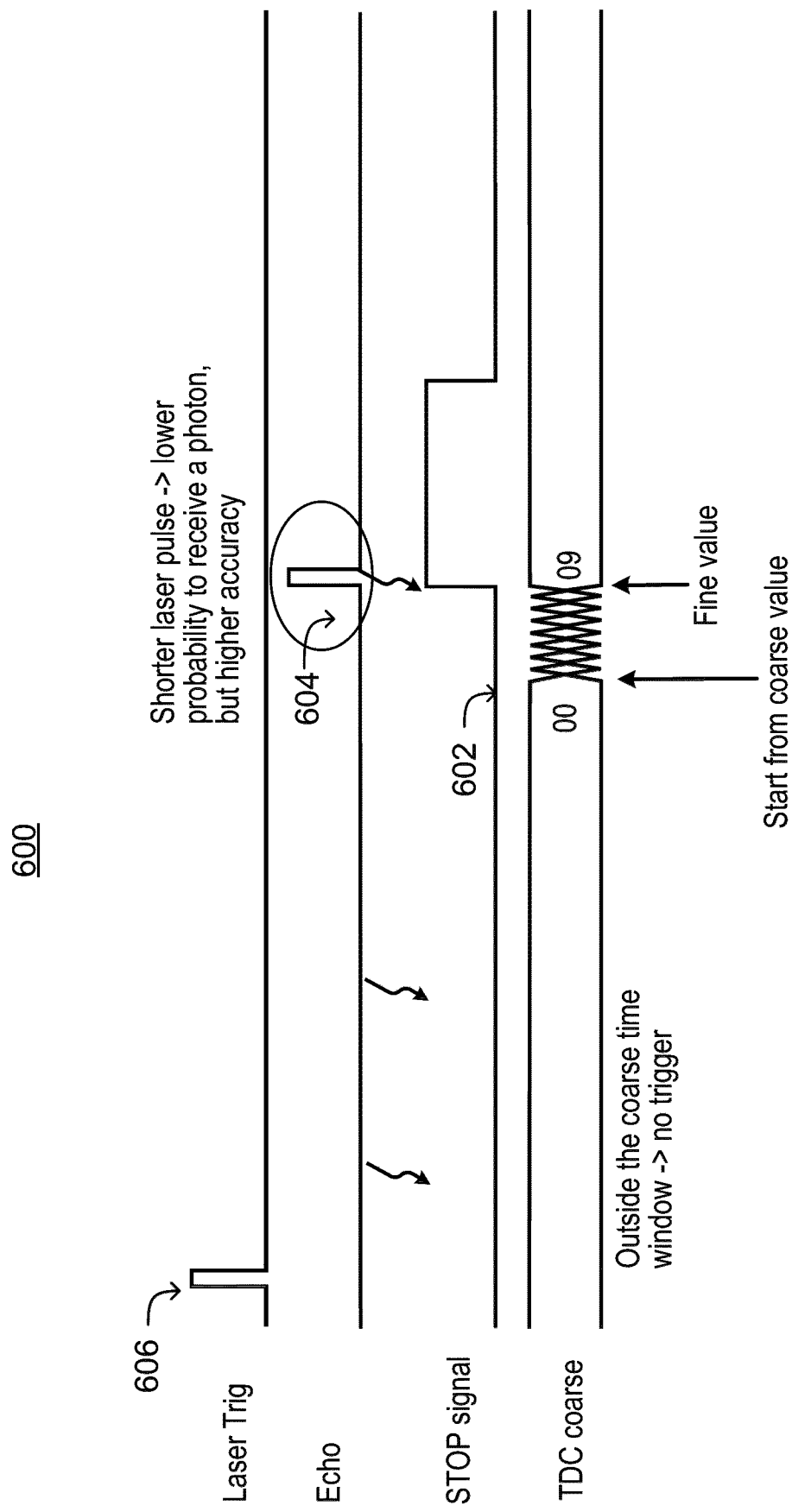
FIG. 6 illustrates using a shorter laser pulse for fine measurement.

In some embodiments, the control circuitry may use a window between the start and stop of the coarse measurement (estimated measurement) to perform a fine evaluation (precise measurement) with short pulses. FIG. 6 illustrates using a shorter laser pulse 606 for fine measurement. Starting from the coarse evaluation 602, echo 604 is detected and all the events generated outside the observation window are discarded. For example, as described above, any data corresponding to light outside the non-ambiguity window is discarded.

In some embodiments, a Pseudo-Random Bit Sequence ("PRBS") can be applied to light emissions. Generally, the maximum rate at which optical pulses may be sent is determined by the maximum distance that the sensor should cover. This limitation may be overcome by using a Pseudo-Random Bit Sequence, applied to light emissions (e.g., light pulses). A known PRBS sequence is stored locally in every pixel and is shifted according to a zoom-in distance range. The feature of the sequence is that every echo which is out of phase is cancelled (i.e., multiple echo, cover glass) but every echo in phase will be added in the fine evaluation. This is achieved because every event that is detected in the coarse window that corresponds to a 1 (pulse sent) is added in the histogram memory, while the events detected in the coarse window corresponding to 0 (no pulse sent) are subtracted from the histogram memory.

Figure 7:
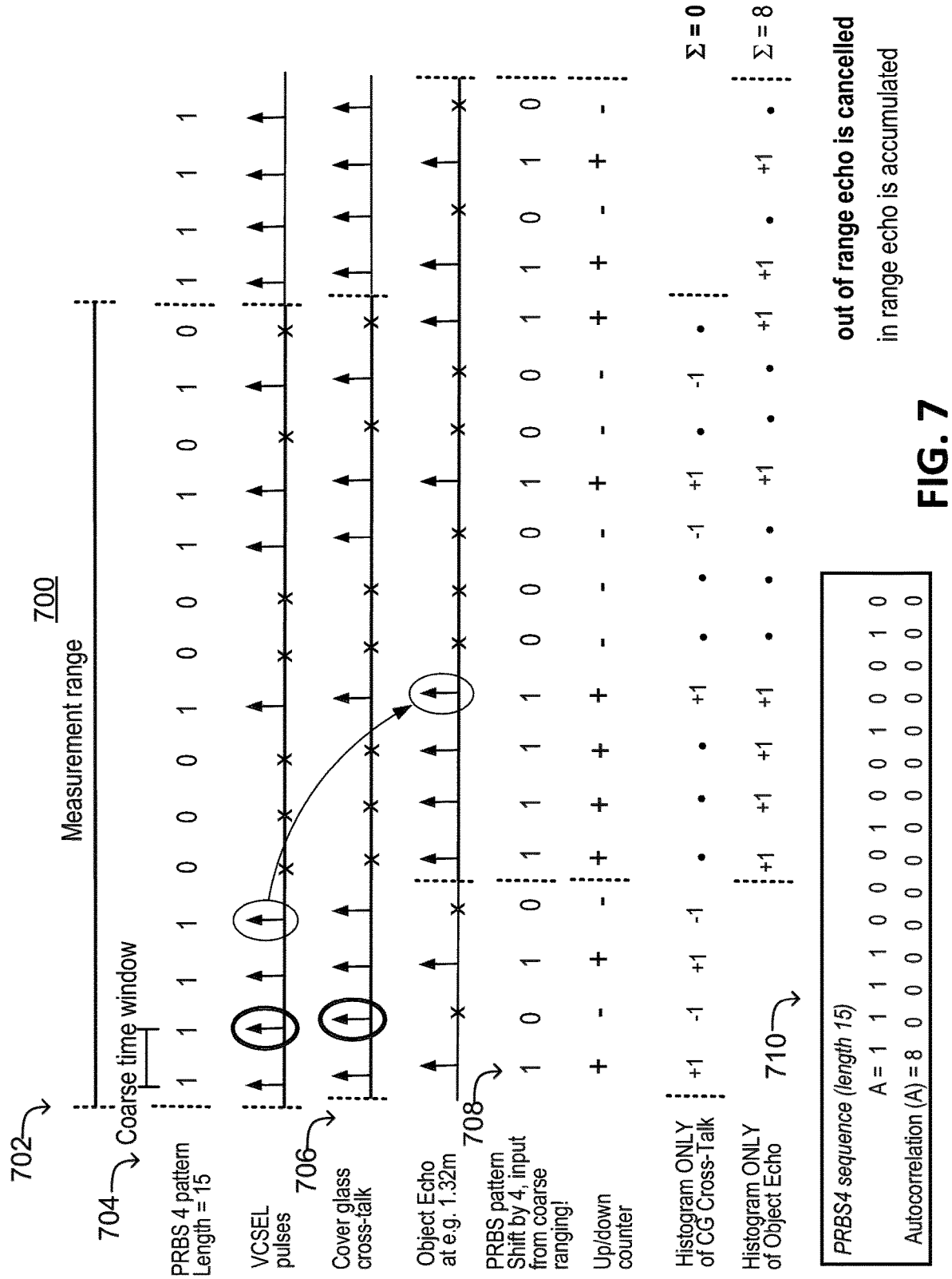
FIG. 7 illustrates an example application of Pseudo-Random Bit Sequence ("PRBS") to light emissions.

FIG. 7 illustrates a possible application of PRBS to light emissions. Measurement range 702 is selected which corresponds to the coarse time window. PRBS pattern is determined (e.g., retrieved from memory). In this case, the length of the sequence is fifteen which divides the course time windows into fifteen time periods. The control circuitry causes emissions during the first, second, third, fourth, eighth, eleventh, twelfth, and fourteenth time periods. As shown in FIG. 7, the emissions may be VCSEL pulses emitted during these intervals. In some embodiments (e.g., when the system is associated with a smart phone or an electronic tablet), the control circuitry may compensate for a cover glass (illustration 706) that is included with the device. Thus, data for objects that are detected within a threshold distance (e.g., a few millimeters from the imaging sensor) may be discarded. The control circuitry may determine, based on the sequence what the shift is from the coarse ranging (illustration 708). Based on the shift, the control circuitry may cause data to be added to the histogram memory and discard data that is outside the window. As shown in FIG. 7, the summation of the in range echo yields autocorrelation 710.

Figure 8:
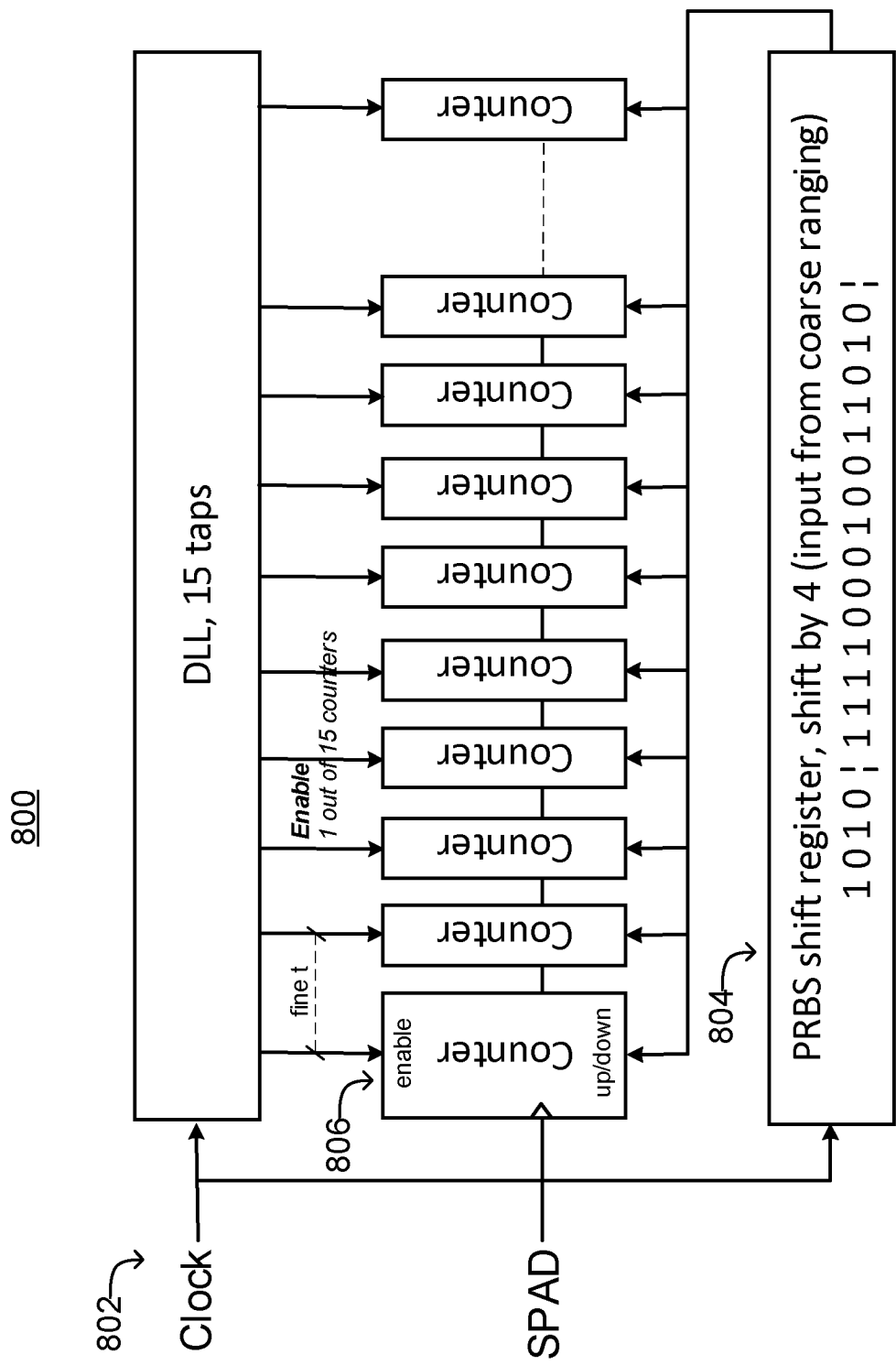
FIG. 8 illustrates an example implementation of fine measurement.

FIG. 8 illustrates one implementation of fine measurement. The control circuitry may use the TDC to perform the fine evaluation with the clock (e.g., clock 802) to the delay line (e.g., delay line 804). A PRBS is loaded in the shift register and shifted according to the coarse evaluation, this is giving the command to the counters (e.g., counter 806) to count up or down. When a SPAD generates a trigger, the counters are clocked and count up or down according to the PRBS, and only the counter with the pulse generated by the distance laser will perform the up/down counting. In some embodiments, this operation may be repeated to build the histogram in the pixel. The control circuitry may use short VCSEL pulses, but at high repetition rate to achieve higher optical power. The control circuitry may also use a delay locked loop with fifteen taps for fine resolution. In some embodiments, the coarse value may be measured multiple times to decrease uncertainty. In addition, the control circuitry may cause the pulse width to vary from longer to shorter for both coarse measurement and fine measurement. Furthermore, the control circuitry may perform the coarse measurement in a cluster of pixels and the fine measurement per pixel.

Figure 9:
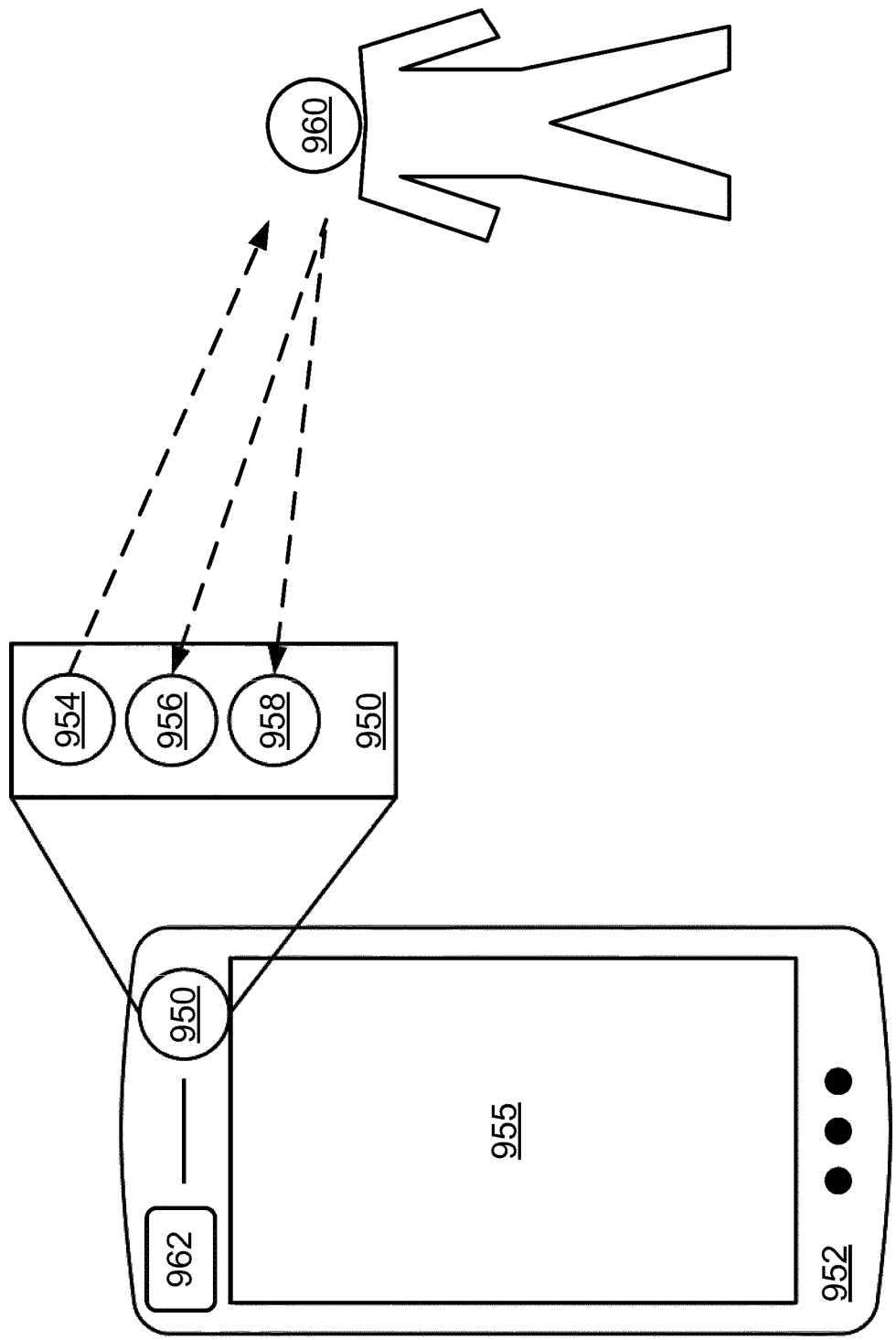
FIG. 9 illustrates an electronic device that may include the distance measuring system coupled with a front-mounted camera.

Referring to FIG. 9, in some examples, a distance measuring system 950 employing ToF sensors such as those described here can be mounted on or incorporated into a front side of a mobile computing device 952, such as a mobile phone, a tablet, or a wearable computing device. The front side of the mobile device 952 is the side of the device that includes a screen 155. Distance measuring system 950 may be a front-side imaging system that includes an illumination device 954 and imaging components including a camera 956 and a ToF imaging sensor 958. The front side distance measuring system 950 may be used for various applications which need to have accurate measurements for distance to objects (e.g., photography, video, and other suitable applications).

Figure 10:
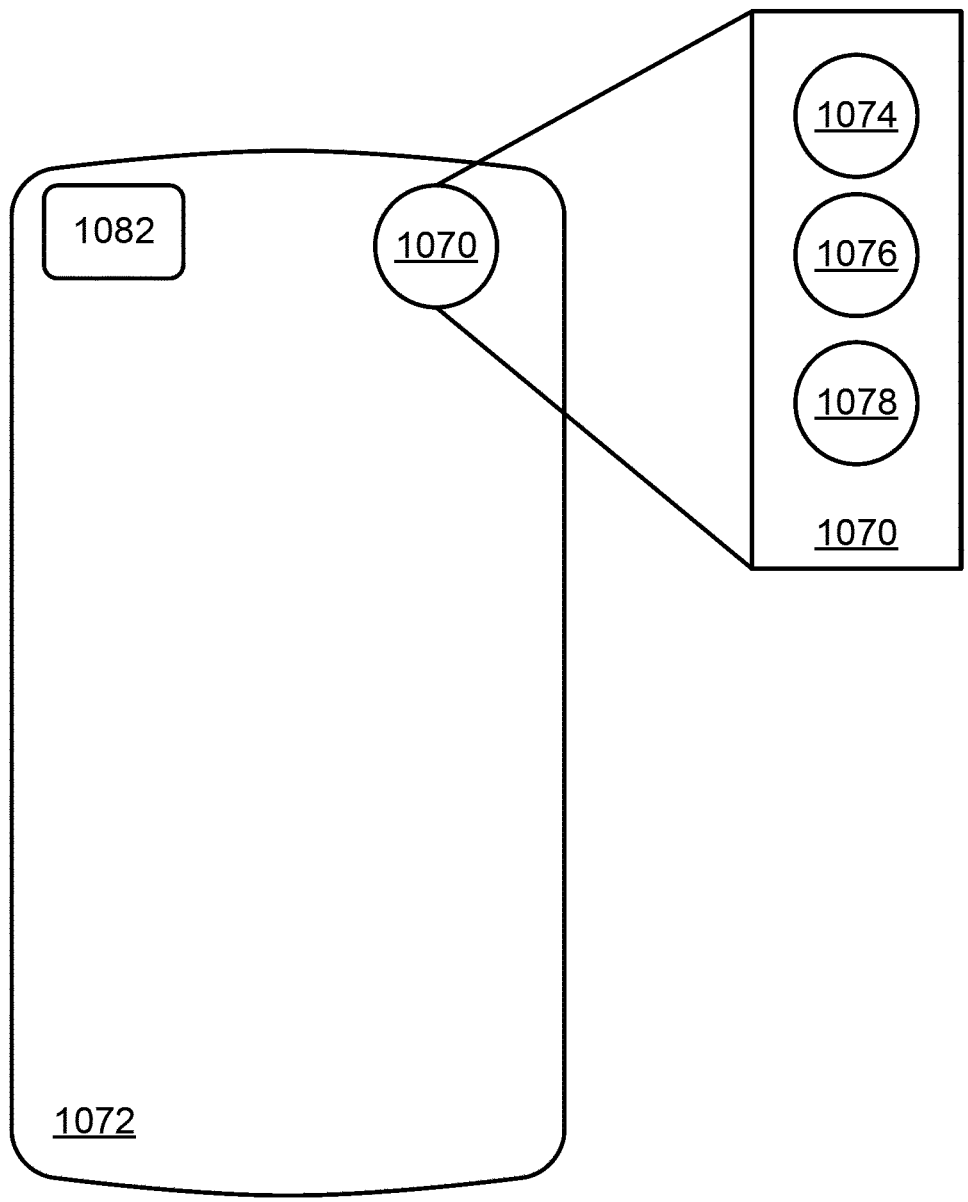
FIG. 10 illustrates an electronic device that may include the distance measuring system coupled with a back-mounted camera.

Referring to FIG. 10, in some examples, a distance measuring system 1070 employing ToF sensors such as those described here may be mounted on a back side of a mobile computing device 1072. The back side is the side of the device opposite the front side, such as the side that does not include a screen. The distance measuring system 1070 may be a back-side imaging system that includes an illumination device 1074 and imaging components including a camera 1076 and a ToF imaging sensor 1078. The back-side distance measuring system 1070 may be used, e.g., for object recognition or for environmental mapping, such as mapping of a room, e.g., by one or more processors 1082.

Various aspects of the subject matter and the functional operations described in this disclosure can be implemented in digital electronic circuitry, or in software, firmware, or hardware, including the structures disclosed in this specification and their structural equivalents, or in combinations of one or more of them. The electronic control unit incorporates digital control circuitry that is configured to perform the actions required to generate an ambient light measurement. In some embodiments, the electronic control unit may incorporate one or more of software, firmware, or other hardware to facilitate the actions of this disclosure. In addition, aspects of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

A number of embodiments have been described. Nevertheless, it will be understood that various modifications may be made without departing from the spirit and scope of the invention. For example, some of the steps described above may be order independent, and thus can be performed in an order different from that described.

Accordingly, other implementations are within the scope of the following claims.

What is claimed is:

1. An apparatus comprising:
   an imaging sensor configured to perform a distance measurement;
   a camera configured to obtain a 2-D image of an environment;
   a memory;
   a light source; and
   control circuitry coupled to the imaging sensor, the camera, the memory and the light source, the control circuitry configured to cause a first light emission from the light source and a second light emission from the light source;
   wherein the imaging sensor is configured to detect a first echo resulting from the first light emission being reflected by an object and to detect a second echo resulting from the second light emission being reflected by the object;
   wherein the control circuitry is further configured to:
   determine, based on the first echo, an estimated distance to the object;
   identify, within the second echo, data corresponding to the estimated distance;
   generate a histogram using the identified data that corresponds to the estimated distance in combination with the 2-D image of the environment obtained from the camera; and
   store the histogram in the memory.

2. The apparatus of claim 1, wherein the control circuitry is further configured to calculate, based on the histogram a distance to the object.

3. The apparatus of claim 1, wherein the control circuitry is configured to:
   retrieve a non-ambiguity period associated with the first light emission;
   determine that the non-ambiguity period from the first light emission has been reached; and
   cause the second light emission after the non-ambiguity period has been reached.

4. The apparatus of claim 1, wherein the first light emission is a first light pulse and the second light emission is a second light pulse, and wherein the first light pulse is longer than the second light pulse.

5. The apparatus of claim 1, wherein the first light emission is modulated at a lower frequency than the second light emission.

6. The apparatus of claim 1, wherein the control circuitry is operable to store the histogram in the memory by performing one or more of:
   discarding data associated with light of the second echo that does not correspond to the estimated distance; and
   discarding data associated with light of the first echo.

7. The apparatus of claim 1, wherein the control circuitry is further configured to:
   retrieve a time period corresponding to maximum time between the first light emission and receiving any echo for the first light emission;
   cause, during the time period, a plurality of light emissions from the light source; and
   cause the light source to stop further light emissions after the time period has ended.

8. The apparatus of claim 7, wherein the control circuitry is further configured to cause the second light emission and the plurality of light emissions in a sequence, wherein the sequence instructs the control circuitry to split the time period into a plurality of time periods and wherein the sequence instructs the control circuitry to cause emissions during some of the plurality of time periods without causing the emissions during other of the plurality of time periods.

9. The apparatus of claim 8, wherein:
   the image sensor is further operable to detect light comprising echoes for the plurality of light emissions and light from other light sources; and
   the control circuitry is further configured to:
   identify, based on the sequence of light emissions, echoes for the plurality of light emissions; and
   subtract, based on the sequence of light emissions, data values associated with signals representing the light from the other light sources.

10. The apparatus of claim 8, wherein the control circuitry is further configured to:
    store data corresponding to echoes for the plurality of light emissions in a histogram memory; and
    generate a measurement of distance to the object based on the data in the histogram memory.

11. A method comprising:
    causing, using a light source, a first light emission and a second light emission;
    detecting using, an imaging sensor, a first echo resulting from the first light emission being reflected by an object and a second echo resulting from the second light emission being reflected by the object;
    obtaining a 2-D image of an environment using a camera;
    determining, based on the first echo, an estimated distance to the object;
    identifying, within the second echo, data corresponding to the estimated distance;
    generating a histogram using the identified data that corresponds to the estimated distance in combination with the 2-D image of the environment obtained from the camera; and
    storing the histogram in a memory.

12. The method of claim 11, further comprising calculating, based on the histogram, a distance to the object.

13. The apparatus of claim 11, further comprising:
retrieving a non-ambiguity period associated with the first light emission;
determining that the non-ambiguity period from the first light emission has been reached; and
causing the second light emission after the non-ambiguity period has been reached.

14. The method of claim 11, wherein the first light emission is a first light pulse and the second light emission is a second light pulse, and wherein the first light pulse is longer than the second light pulse.

15. The method of claim 11, wherein the first light emission is modulated at a lower frequency than the second light emission.

16. The method of claim 11, wherein storing the histogram in the memory comprises:
discarding data associated with light of the second echo that does not correspond to the estimated distance; and
discarding data associated with light of the first echo.

17. The method of claim 11, further comprising:
retrieving a time period corresponding to maximum time between the first light emission and receiving any echo for the first light emission;
causing, during the time period, a plurality of light emissions from the light source; and
causing the light source to stop further light emissions after the time period has ended.

18. The method of claim 17, further comprising causing the second light emission and the plurality of light emissions in a sequence, wherein the sequence instructs control circuitry to split the time period into a plurality of time periods and wherein the sequence instructs the control circuitry to cause emissions during some of the plurality of time periods without causing the emissions during other of the plurality of time periods.

19. The method of claim 18, further comprising:
detecting, using the imaging sensor, light comprising echoes for the plurality of light emissions and light from other light sources;
identifying, based on the sequence of light emissions, echoes for the plurality of light emissions; and
subtract, based on the sequence of light emissions, data values associated with signals representing the light from the other light sources.

20. The method of claim 18, further comprising:
storing data corresponding to echoes for the plurality of light emissions in a histogram memory; and
generating a measurement of distance to the object based on the data in the histogram memory.

* * * * *